No. 809,747. PATENTED JAN. 9, 1906.
A. RICHARDSON & T. S. JONES.
HANGER OR EAR FOR OVERHEAD ELECTRIC TROLLEY WIRES.
APPLICATION FILED FEB. 6, 1905.

WITNESSES.
Joseph Bates
E. Howard

INVENTORS.
Abraham Richardson
Thos. S. Jones

UNITED STATES PATENT OFFICE.

ABRAHAM RICHARDSON AND THOMAS SMITH JONES, OF BLACKPOOL, ENGLAND, ASSIGNORS OF SIX-EIGHTHS TO JOSEPH HEAP, HENRY HEAP, JAMES BAILEY, THOMAS BRIERLEY, ROBERT BILLINGTON, AND JAMES HAYDOCK, OF BLACKPOOL, ENGLAND.

HANGER OR EAR FOR OVERHEAD ELECTRIC TROLLEY-WIRES.

No. 809,747.     Specification of Letters Patent.     Patented Jan. 9, 1906.

Application filed February 6, 1905. Serial No. 244,374.

*To all whom it may concern:*

Be it known that we, ABRAHAM RICHARDSON and THOMAS SMITH JONES, British subjects, and residents of Blackpool, in the county of Lancaster, England, have invented certain new and useful Improvements in Hangers or Ears for Overhead Electric Trolley-Wires, of which the following is a specification.

This invention relates to ears or hangers for supporting or holding up electric conductor-wires, to which the wires are secured mechanically by clamping the two sides of the hanger together without the necessity of soldering the conductor-wire thereto. Hangers of this type have been constructed with a bolt-head inserted between two loose shanks to force them outward into a socket.

It consists, essentially, in constructing the two parts of the hanger which grip the wire with a shank or the like for supporting same, preferably made slightly taper, over which a similarly taper or other ring or collar fits, the shanks of the two parts of the hanger being hollowed to receive a loose sliding block or nut, into which insulator-bolt is screwed to tighten the collar on the shanks, and so clamp the two parts of the hanger together.

The invention will be fully described with reference to the accompanying drawings.

Figures 1, 3:
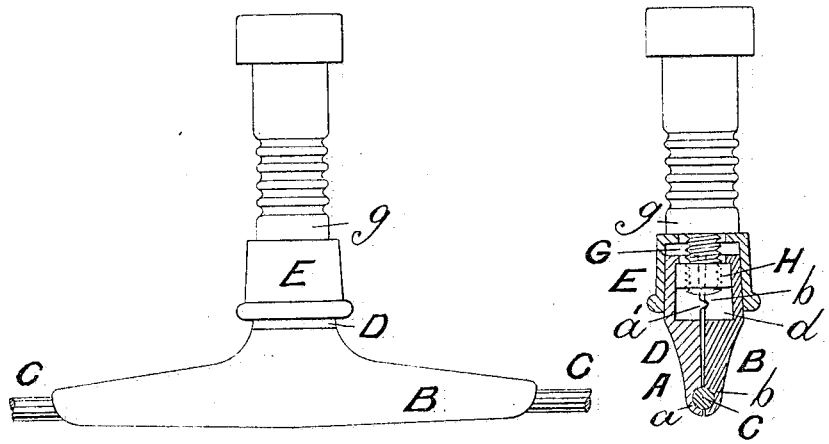
Figure 2:
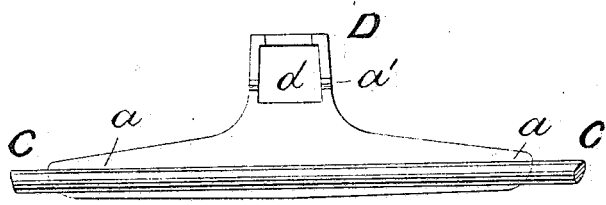

Figure 1 is a side elevation; Fig. 2, a side elevation of interior side of one of the jaws; Fig. 3, a transverse section.

The hanger or ear is constructed of two jaws A and B, with grooves $a$ $b$ at their lower edges to receive the conductor-wire C, as is customary in what are known or described as "mechanical" hangers or ears. The jaws may wholly or partially grip the wires. The jaws A and B are formed with shanks D, flat on one side, which when placed together form a shank approximately cylindrical or somewhat conical. The interior of the shanks D is recessed to form a recess or socket $d$, which is preferably narrower at the top than at the bottom. Into the recess $d$ a loose block or nut H is placed, which is free to be moved from the bottom to the top of the recess, and as it is moved upward it tends to force the upper parts of the shank apart and the jaws together to clamp the wire C. A projection $a'$ on one jaw, preferably fitting into a notch $b'$ in the other, forms a fulcrum upon which the parts rock. Over the shank a ring or collar E is placed and forced down by the insulator-bolt G, entering the nut H, the flange $g$ of which abuts against the top of the collar. The insulator-bolt G draws the block or nut H up, and the flange $g$ forces the collar E down. To press the collar or ring E over the shank D of the hanger, the insulator-bolt G is screwed into the nut H. The flange $g$ on the screw abuts against the top of the collar E and draws the nut upward in the recess $d$, expanding the top of the shank into the ring or collar, and at the same time forces the collar down over the shank, thereby securely gripping the conductor-wire C between the jaws. The insulator-bolt G serves also for securing the hanger in position in any convenient way.

What we claim as our invention, and desire to protect by Letters Patent, is—

1. An ear or hanger for supporting or holding up electric conductor-wires constructed with two jaws to grip the wires, upwardly-extending shanks to said jaws with an inclined recess a loose nut placed in the said recess, a collar placed over the shanks and the insulator-bolt fitting into the nut and a flange thereon abutting against the collar to draw the nut up and force the collar down substantially as described.

2. In an ear or hanger the combination with the jaws A and B provided with shanks D and formed with an inclined recess $d$ of the loose nut H placed thereon, the collar E fitting over the shanks, and the insulator-bolt G engaging with the nut H to draw the nut up and force the collar down over the shank substantially as described and shown.

In witness whereof we have hereunto signed our names in the presence of two subscribing witnesses.

ABRAHAM RICHARDSON.
    THOMAS SMITH JONES.

Witnesses:
    J. OWDEN O'BRIEN,
    B. VOLTRAM WOODHEAD.